United States Patent
Lee et al.

(10) Patent No.: US 7,450,719 B2
(45) Date of Patent: Nov. 11, 2008

(54) GIGABIT ETHERNET-BASED PASSIVE OPTICAL NETWORK AND DATA ENCRYPTION METHOD

(75) Inventors: Hak-Phil Lee, Inchon (KR); Se-Kang Park, Seonam-si (KR); Whan-Jin Sung, Suwon-si (KR); Young-Seok Kim, Seongnam-si (KR); Yun-Je Oh, Yongin-si (KR); Jun-Sung An, Suwon-si (KR); Tae-Sung Park, Yongin-si (KR); Su-Hyung Kim, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 1112 days.

(21) Appl. No.: 10/759,719

(22) Filed: Jan. 16, 2004

(65) Prior Publication Data

US 2005/0047602 A1 Mar. 3, 2005

(30) Foreign Application Priority Data

Aug. 26, 2003 (KR) .................. 10-2003-0059018

(51) Int. Cl.
*H04K 1/00* (2006.01)
*H04L 9/00* (2006.01)
*H04L 9/30* (2006.01)
*G06F 7/04* (2006.01)
*G06F 17/30* (2006.01)
*G06K 9/00* (2006.01)
*H04L 9/32* (2006.01)

(52) U.S. Cl. ............ 380/256; 380/259; 380/282; 380/30; 726/2; 726/3

(58) Field of Classification Search ............... 380/256, 380/30, 259, 282; 726/2, 3
See application file for complete search history.

(56) References Cited

U.S. PATENT DOCUMENTS

| 5,737,420 A | * | 4/1998 | Tomko et al. ............ 380/285 |
| 7,184,553 B2 | * | 2/2007 | Mahlab et al. ............ 380/256 |
| 2002/0164035 A1 | * | 11/2002 | Yokota et al. ............ 380/278 |
| 2004/0193902 A1 | * | 9/2004 | Vogler et al. ............ 713/193 |
| 2005/0004875 A1 | * | 1/2005 | Kontio et al. ............ 705/52 |

\* cited by examiner

*Primary Examiner*—Ayaz Sheikh
*Assistant Examiner*—Shin-Hon Chen
(74) *Attorney, Agent, or Firm*—Cha & Reiter, LLC (57) ABSTRACT

A Gigabit Ethernet-based passive optical network that can reliably transmit data is disclosed. The network includes an OLT for receiving a public key through a transmission medium, encrypting a secret key by means of the received public key, transmitting the encrypted secret key, encrypting data by means of the secret key, and transmitting the encrypted data, the OLT being located in a service provider-side. The network also includes an ONT for transmitting the public key to the OLT, receiving the secret key transmitted from the OLT, decrypting the secret key by means of a private key, receiving the data, and decrypting the received data by means of the decrypted the secret key. The public key is used for encrypting the secret key. The secret key is encrypted by means of the public key. The data is encrypted by the OLT by means of the secret key.

13 Claims, 6 Drawing Sheets

GIGABIT ETHERNET-BASED PASSIVE OPTICAL NETWORK AND DATA ENCRYPTION METHOD

CLAIM OF PRIORITY

This application claims priority to an application entitled "Gigabit Ethernet-based passive optical network which can reliably transmit data and data encryption method using the same," filed in the Korean Intellectual Property Office on Aug. 26, 2003 and assigned Serial No. 2003-59018, the contents of which are hereby incorporated by reference.

BACKGROUND OF THE INVENTION

1. Field of the Invention

The present invention relates to a gigabit Ethernet-based passive optical network including an optical line terminal (OLT) provided in a service provider-side and a plurality of optical network terminals (ONT) provided in a user-side, and more particularly to an encryption method for data security between the OLT and the plurality of ONTs.

2. Description of the Related Art

Currently, large quantities of data can be shared in an online state owing to expansion of public networks such as various wireless networks and an ultra-high speed communication network. Data sharing in an offline state is widely used through high capacity storage media such as CDs and DVDs. In this way, users can receive numerous types of data shared online and offline. However, security systems for such online and offline data sharing systems are generally weak.

A passive optical network (hereinafter, referred to as a PON) is a communication network system that transmits signals to an end-user through an optical cable network. The PON includes one OLT installed on a communication company and a plurality of ONTs installed in a subscriber's premise. In general, a maximum of 32 ONTs can be connected to one OLT.

The PON can provide each UE (user) with 622 Mbps of bandwidth in downstream transmission and 155 Mbps of bandwidth in upstream transmission, which can be assigned to a plurality of users utilizing the PON. The PON can be used as a trunk between a large scale system such as a cable TV system and a nearby building, or between a large scale system and an Ethernet network for a household using a coax cable.

The OLT transmits a corresponding signal to the ONT through an optical cable. The ONT receives the signal transmitted from the OLT, processes the received signal, and then transmits the processed signal to an end-user. The ONT, which is a transport system in a service subscriber-side, constitutes terminating equipment in an optical communication network that provides a service interface to an end-user.

The ONT services a fiber to the curb (FTTC), a fiber to the building (FTTB), a fiber to the floor (FTTF), a fiber to the home (FTTH) and a fiber to the office (FTTO), etc. Therefore, the ONT is required to provide high service accessibility for users. The ONT connects a cable, which is connected to a subscriber and which transmits an analog signal transmitted from the subscriber, to optical facilities that are connected to the OLT and transceive optical signals.

In this way, the ONT converts an optical signal transmitted from the OLT into an electric signal (photoelectric conversion), and transmits the converted signal to a subscriber. In addition, the ONT converts an electric signal transmitted from a subscriber into an optical signal (electrooptic conversion), and transmits the converted signal to the OLT.

Figure 1:
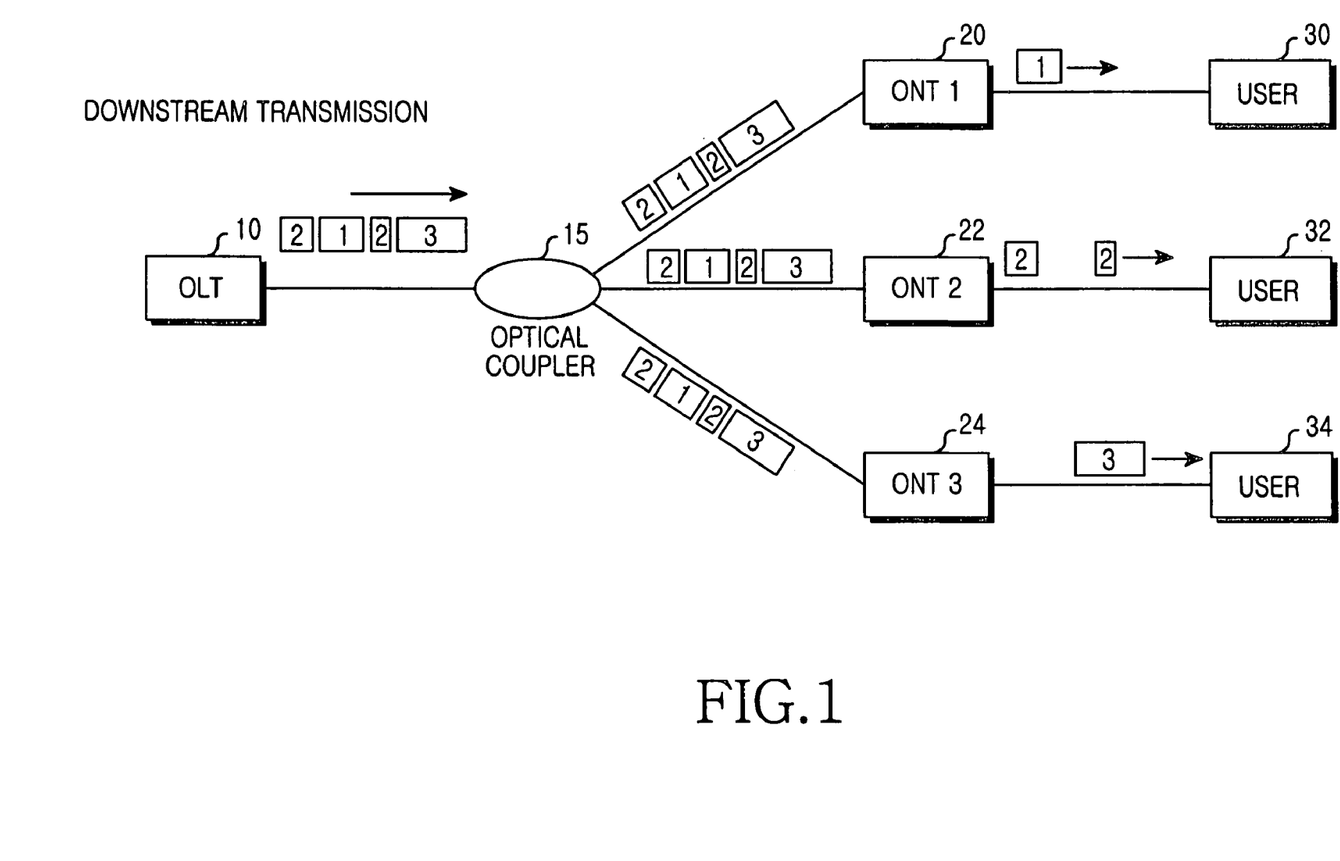
FIG. 1 is a block diagram showing a downstream transmission structure of data in a Gigabit Ethernet passive optical network.
Figure 2:
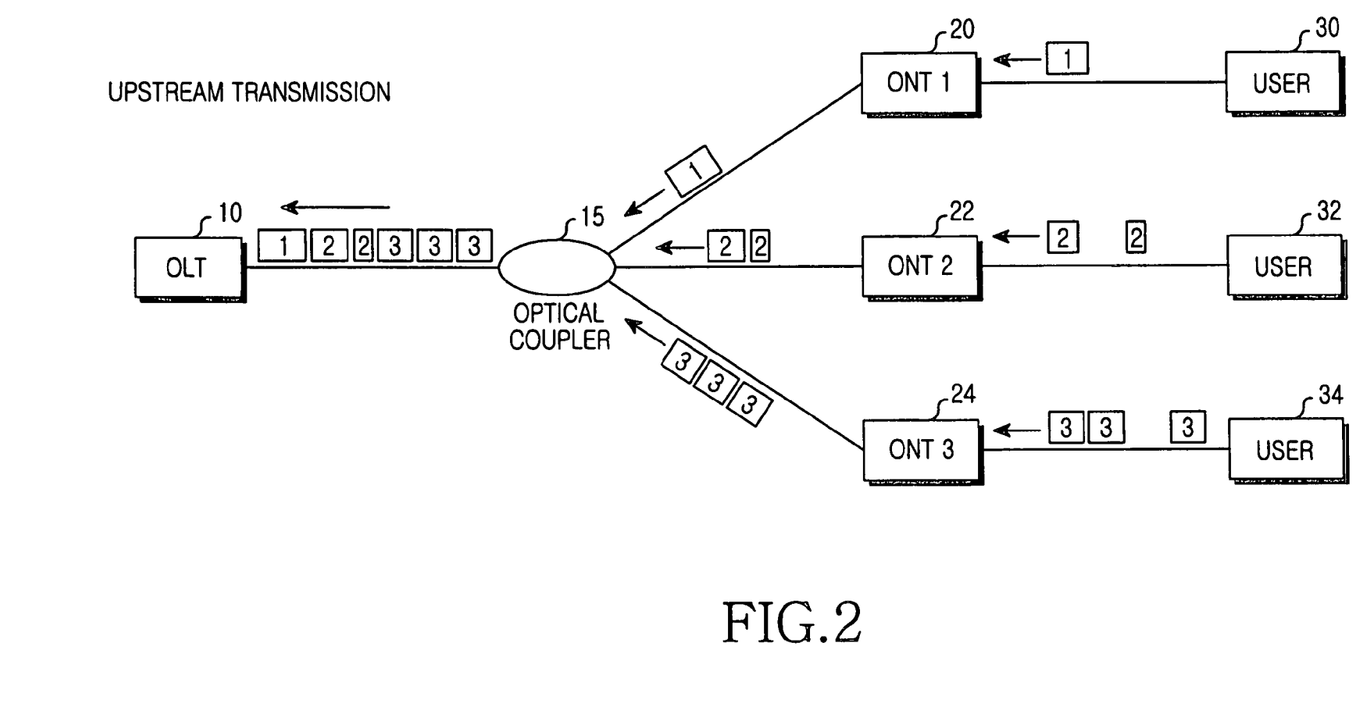
FIG. 2 is a block diagram showing an upstream transmission structure of data in a Gigabit Ethernet passive optical network.

FIG. 1 is a block diagram showing a downstream transmission structure of data in a Gigabit Ethernet-PON, and FIG. 2 is a block diagram showing an upstream transmission structure of data in the Gigabit Ethernet-PON.

As shown in FIGS. 1 and 2, the Gigabit Ethernet-PON (hereinafter, referred to as a GE-PON) has a tree structure in which one OLT 10 is connected to a plurality of ONTs 20, 22 and 24 through an optical coupler 15. Using the GE-PON, a cost-effective subscriber network can be constructed as compared to an activity-on-node (AON).

The first type of GE-PON standardized was an asynchronous transfer mode passive optical network (hereinafter, referred to as an ATM-PON). ATM cells are transmitted upstream or downstream in the form of blocks each of which consists of a predetermined number of ATM cells. In contrast, in an Ethernet-PON (hereinafter, referred to as an E-PON), packets having different sizes are transmitted in the form of blocks, each of which includes a predetermined number of packets. Accordingly, the E-PON has a more complex control structure in contrast to the ATM-PON.

The downstream transmission of data will be described with reference to FIG. 1. In the case of the downstream transmission, the OLT 10 broadcasts data to be transmitted to the ONTs 20, 22 and 24. When the data transmitted from the OLT 10 is received, the optical coupler 15 transmits the received data to each of the ONTs 20, 22 and 24. Each of the ONTs 20, 22 and 24 detects data that is to be transmitted to each of users 30, 32 and 34 from the data transmitted from the optical coupler 15. Then, each of the ONTs 20, 22 and 24 transmits only detected data to each of users 30, 32 and 34.

The upstream transmission of data will be described with reference to FIG. 2. In the case of the upstream transmission, data transmitted from each of the users 30, 32 and 34 is transmitted to each of the ONTs 20, 22 and 24. Each of the ONTs 20, 22 and 24 transmits the data transmitted from the users 30, 32 and 34 to the optical coupler 15 when transmission permission is promised by the OLT 10. In this case, each of the ONTs 20, 22 and 24 transmit upstream each data received during time set by a time division multiplexing (TDM) method. Accordingly, data collision according to upstream transmission of data does not occur in the optical coupler 15.

With the development of Internet technology, service subscribers have required data services which need larger bandwidths and have been attracted to an end-to-end transmission using Gigabit Ethernet technology which is relatively low-priced and can secure a higher bandwidth in comparison to the ATM technology which requires relatively expensive equipment, has limitation in the bandwidth, and must perform segmentation of IP packets. Thus, even in a PON structure of a subscriber network, the Ethernet type is required rather than the ATM.

In a packet protocol data unit (hereinafter, referred to as PDU), an encryption method used in the ATM-PON. An encryption key having a size of 24 bytes is used as a churning key. Since the method has encryption ability that enables a value of a key to be updated each second and uses a relatively simple algorithm, it is used so that high-speed support may be performed in an ATM-PON having a speed of 622 Mbps. Periodically updated values of a key are generated in an ONT, inserted into a payload portion in an operation, administration and maintenance (hereinafter, referred to as an OAM) cell, and then transmitted to each OLT.

The packet PDU encryption method includes data over cable service interface specification (DOCSIS) method using a data encryption standard with cipher block chaining (DES-CBC) encryption method in addition to the churning method.

In the case of the ATM-PON, a churning key of 3 bytes is inserted into the OAM cell owing to both limitation of encryption technology and possibility of high-speed support, but it causes a limitation in the ability of the encryption key itself.

Since the GE has a faster speed than the ATM-PON (e.g., 622 Mbps), it is inefficient for the GE to use the encryption method of the ATM-PON. Key period in the DOCSIS using the DES-CBC encryption method must be repeated every 12 hours so that authorized wiretapping by malicious users can be prevented.

Accordingly, when the DES-CBC encryption method is applied to the GE-PON, the application may aggravate inefficiency to an OLT, which must manage a plurality of ONTs in a point-to-multipoint structure. Further, since the GE-PON has a point-to-multipoint structure, which is relatively vulnerable to encryption, the encryption problem of user data transmitted through an upstream/downstream link is significant. Accordingly, a powerful and efficient encryption key method must be selected and effectively used. However, standardization with respect to an encryption method of the GE-PON and key management scheduling scheme is just being developed in IEEE 802.3ah, and it is in a state in which a packet format has not been decided yet.

SUMMARY OF THE INVENTION

One aspect of the present invention is related to a Gigabit Ethernet-based passive optical network that can reliably transceive data between one OLT and a plurality of ONTs and a data encryption method using the same.

Another aspect of the present invention is related to a Gigabit Ethernet-based passive optical network that can heighten security with respect to data when a downstream transmission is performed from one OLT to a plurality of ONTs and a data encryption method using the same.

Yet another embodiment of the present is directed to a Gigabit Ethernet-based passive optical network including an OLT for receiving a public key through a transmission medium, encrypting a secret key by means of the received public key, transmitting the encrypted secret key, encrypting data by means of the secret key, and transmitting the encrypted data. The OLT is located in a service provider-side The network also includes an ONT for transmitting the public key to the OLT, receiving the secret key transmitted from the OLT, decrypting the secret key by means of a private key, receiving the data, and decrypting the received data by means of the decrypted the secret key. The public key is used for encrypting the secret key. The secret key is encrypted by means of the public key. The data is encrypted by the OLT by means of the secret key.

In another embodiment, the OLT includes a GE-PON OLT MAC module, a GMII module, an OLT key management unit, and a data encryption unit. The GE-PON OLT MAC module transmits input data to a predetermined path. The GMII module provides an interface between a transmission medium and the GE-PON OLT MAC module. The OLT key management unit manages a public key transmitted from the ONT and a secret key for encrypting the data. The data encryption unit encrypts the data by means of the secret key.

In another embodiment, the GMII module includes a PCS module, a PMA module, and a PMD module. The PCS module selectively encodes or decodes input data by the unit of a predetermined block and outputting the encoded data or the decoded data. The PMA module selectively performs a serial conversion or a parallel conversion with respect to inputted data and outputting the converted data. The PMD module converts electrical signals, which are data output from the PMA module, into optical signals, transmits the optical signals to the transmission medium, converts optical signals received through the transmission medium 300 into electrical signals, and transmits the electrical signals to the PMA module.

The OLT key management unit may include a public key storage unit, a secret key generation unit, and a secret key encryption unit. The public key storage unit stores a public key transmitted from the ONT. The secret key generation unit generates a secret key for encrypting the data when the public key is stored in the public key storage unit. The secret key encryption unit encrypts the secret key generated by secret key generation unit by means of the public key stored in the public key storage unit.

The ONT may include a GE-PON OLT MAC module, a GMII module, an ONT key management unit, and a data decryption unit. The GE-PON OLT MAC module transmits input data to a predetermined path. The GMII module provides an interface between a transmission medium and the GE-PON OLT MAC module. The ONT key management unit manages a public key and a private key and decrypts the encrypted data transmitted from the OLT by means of the private key. The data decryption unit decrypts the encrypted data transmitted from the OLT by means of the secret key decrypted by the OLT key management unit. The GMII module may have the same structure as that of the GMII module included in the OLT.

The ONT key management unit may include a public key storage unit for storing the public key, a private key storage unit for storing the private key; and a secret key decryption unit for decrypting the encrypted secret key transmitted from the OLT by means of the secret key stored in the private key storage unit, and outputting the decrypted secret key to the data decryption unit.

In one aspect of the present invention, the public key and the private key respectively represent a RSA public key and a RSA private key. The secret key may be an AES secret key.

Yet another embodiment of the present invention is directed to an encryption method including the steps of: a) the ONT transmitting a public key to the OLT; b) the OLT encrypting a secret key by means of the public key transmitted from the ONT and transmitting the encrypted secret key to the ONT; c) the ONT decrypting the encrypted secret key transmitted from the OLT by means of a private key; d) the OLT encrypting data by means of the secret key and transmitting the encrypted data to the ONT; and e) the ONT decrypting the encrypted data transmitted from the OLT by means of the decrypted secret key.

For example, the OLT may encrypt the AES secret key by means of the RSA public key transmitted from the ONT and transmits the encrypted AES secret key to the ONT. The OLT encrypts data by means of the AES secret key and transmits the encrypted data to the ONT. Accordingly, data can be efficiently encrypted in the GE-PON having a point-to-multipoint structure.

In addition, the ONT may transmit the RSA public key to the OLT, and the public key is shared by the ONT and the OLT. The OLT encrypts the AES secret key, which is used for encrypting data be means of the RSA public key, and transmits the encrypted AES secret key to the ONT, and the secret key is shared by the ONT and the OLT. Accordingly, data, which will be transmitted, can be efficiently encrypted in a GE-PON having the point-to-multipoint structure.

In such a GE-PON, the OLT and a plurality of ONTs share the RSA public key and the AES secret key in a state in which they mutually correspond in a one-to-one fashion. Further, only the ONT having a corresponding AES secret key capable of decrypting encrypted data can decrypt data by means of corresponding AES secret key, even through the OLT encrypts data by means of corresponding AES secret key and transmits the encrypted data to all the ONTs. Accordingly, data can be efficiently encrypted in a network structure having a point-to-multipoint structure.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, various embodiments of the present invention will be described with reference to the accompanying drawings. The same reference numerals are used to designate the same elements as those shown in other drawings. In the below description, many particular items, such as detailed elements of circuit, are shown, but these are provided for helping the general understanding of the present invention, it will be understood by those skilled in the art that the present invention can be embodied without particular items. In the following description of the present invention, a detailed description of known functions and configuration incorporated herein will be omitted when it may obscure the subject matter of the present invention.

Hereinafter, a data encryption method for reliably transfer data between one OLT and a plurality of ONTs in a Gigabit Ethernet passive optical network (hereinafter, referred to as a GE-PON) structure according to one embodiment the present invention will be in detail described. The data encryption method utilizes an advanced encryption standard (hereinafter, referred to as an AES) secret key algorithm that uses a secret key having a length of 128 bits or a Rijndael algorithm. A rivest, shamir and adleman (RSA) public key algorithm using a public key and a private key which have a length of 1024 bits is utilized as a key encryption algorithm for exchanging the secret key between an OLT and an ONT on an open line.

A detailed description with respect to the AES secret key algorithm and the RSA public key algorithm is disclosed in both the reference R. Rivest, A. Shamir, and L. Adleman, "A Method for Obtaining Digital Signatures and Public-key Cryptosystems," Communications of the ACM, 21 (2), pp, 120-126, February 1978 and the reference RSA Laboratories, "PKCS #1 v2.1: RSA Cryptography Standard," June 2002.

As described above, the standard regarding an initial registration procedure between an OLT and an ONT in a GE-PON has been already published, but no item regarding data encryption for transferring data has been decided yet. Accordingly, in various embodiments of the present invention, entire data, except for a destination address (DA) field and a source address (SA) field in a standard packet format of the GE-PON, are encrypted in the course of data encryption using the AES secret key algorithm in the GE-PON.

The AES secret key is encrypted with the RSA public key by means of the RSA algorithm. The encrypted AES secret key is inserted into a user data protocol data unit (PDU) portion in an Ethernet frame and then transmitted to a lower layer.

In another embodiment of the present invention, no data can be transmitted as plaintext before a secret key and a public key are completely exchanged between the OLT and the ONT. Therefore, transmission between an OLT and an ONT must obey a standard GE-PON registration procedure that includes a key exchange procedure for data encryption.

Figure 3:
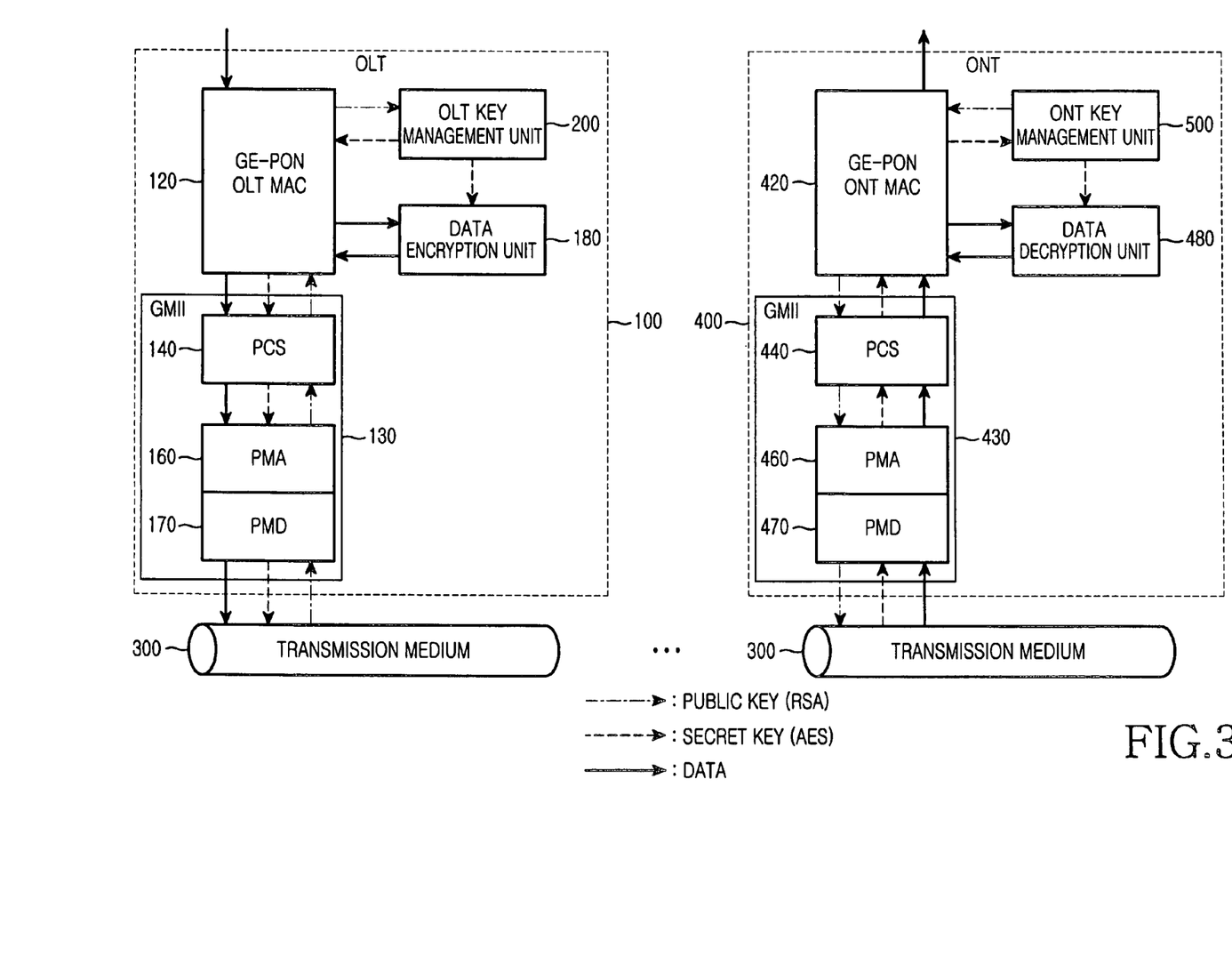
FIG. 3 is a block diagram of a Gigabit Ethernet passive optical network that encrypts data in order to reliably transceive data between an OLT and an ONT according to an embodiment of the present invention.

FIG. 3 is a block diagram of a GE-PON that encrypts data in order to reliably transfer data between an OLT and an ONT according to an embodiment of the present invention. For reference, data encryption may be performed in a data link layer or a GE-PON MAC layer corresponding to an open systems interconnection (hereinafter, referred to as an OSI) layer 2.

As shown in FIG. 3, the GE-PON includes an OLT 100 and an ONT 400 that set mutual channels and transfers data through a transmission medium 300.

The OLT 100 may include a GE-PON OLT MAC module 120, a Gigabit media independent interface (hereinafter, referred to as a GMII) module 130, an OLT key management unit 200 and a data encryption unit 180.

The GE-PON OLT MAC module 120 supports a CSMA/CD operation with respect to data input from the OSI layer 2 from among OSI layer 7. The GMII module 130 provides a mutual interface between a physical layer, which is an OSI layer 1, and a MAC layer which is an OSI layer 2. The GMII is an interface that expands a media independent interface (hereinafter, referred to as MII) used in a high-speed Ethernet, which supports data processing speeds of 10 Mbps, 100 Mbps and 1000 Mbps. Since the GMII module 130 has a data transceiving path of 8 independent bits, it can support full-duplex and half-duplex transmission.

The GMII in which the GMII module 130 is located includes three sub-layers. The GMII includes a physical coding sub-layer (hereinafter, referred to as PCS), a physical medium attachment (hereinafter, referred to as PMA), and a physical medium dependent (hereinafter, referred to as PMD). Each of the sub-layer includes a module corresponding to each sub-layer.

A PCS module 140 provided in the PCS encodes and decodes input data by the unit of a predetermined block. A PMA module 160 provided in the PMA sub-layer performs a serial conversion with respect to data input from the PCS through the PCS module 140, and it performs a parallel conversion with respect to data input from the PMD sub-layer. A PMD module 170 provided in the PMD sub-layer converts an electrical signal, which is data transmitted from the PMA sub-layer through the PMA module 160, into an optical signal, and then transmits the optical signal to the transmission medium 300. The PMD module 170 converts an optical signal received through the transmission medium 300 into an electrical signal and then transmits the electrical signal to the PMA sub-layer.

When a RSA public key transmitted from the ONT 400 is received, the OLT key management unit 200 generates an AES secret key and encrypts the AES secret key by means of the RSA public key. The AES secret key encrypted as described above is transmitted to the ONT 400 through the transmission medium 300 via the GE-PON OLT MAC module 120 and the GMII module 130.

The data encryption unit 180 encrypts plaintext data by means of the AES secret key. Cryptography data encrypted as described above is transmitted to the ONT 400 through the transmission medium 300 via the GE-PON OLT MAC module 120 and the GMII module 130.

The ONT 400 may also include a GE-PON OLT MAC module 420 and a GMII module 430, an ONT key management unit 500 and a data decryption unit 480.

The GE-PON OLT MAC module 420 and the GMII module 430 respectively correspond to the GE-PON OLT MAC module 120 and the GMII module 130 and perform the same functions as those of the GE-PON OLT MAC module 120 and the GMII module 130. The ONT key management unit 500 includes the RSA public key, which is used for encrypting the AES secret key in the OLT 100, and a RSA private key used for decrypting the AES secret key encrypted by means of the RSA public key.

When the ONT 400 needs to receive a data service from the OLT 100, the ONT key management unit 500 transmits a stored RSA public key to the OLT 100 through the transmission medium 300 via the GE-PON OLT MAC module 420 and the GMII module 430. When an AES secret key, which has been encrypted by means of the RSA public key transmitted to the OLT 100, is received, the ONT key management unit 500 decrypts the encrypted AES secret key by means of a stored RSA private key.

When data encrypted by means of the AES secret key are received from the OLT 100, the data decryption unit 480 decrypts the encrypted data by means of the AES secret key decrypted by the ONT key management unit 500.

As described above, the OLT 100 encrypts the AES secret key by means of the RSA public key transmitted from the ONT 400 and transmits the encrypted AES secret key to the ONT 400. The OLT 100 encrypts data by means of the AES secret key and transmits the encrypted data to the ONT 400. In this way, data can be efficiently encrypted in the GE-PON having a point-to-multipoint structure.

The ONT 400 transmits the RSA public key to the OLT 100, and the public key is shared by the ONT 400 and the OLT 100. The OLT 100 encrypts the AES secret key, which is used for encrypting data by means of the RSA public key, and transmits the encrypted AES secret key to the ONT 400, and thus the secret key is shared by the ONT 400 and the OLT 100. In this way, data, which will be transmitted, can be efficiently encrypted in a GE-PON having the point-to-multipoint structure.

Figure 4:
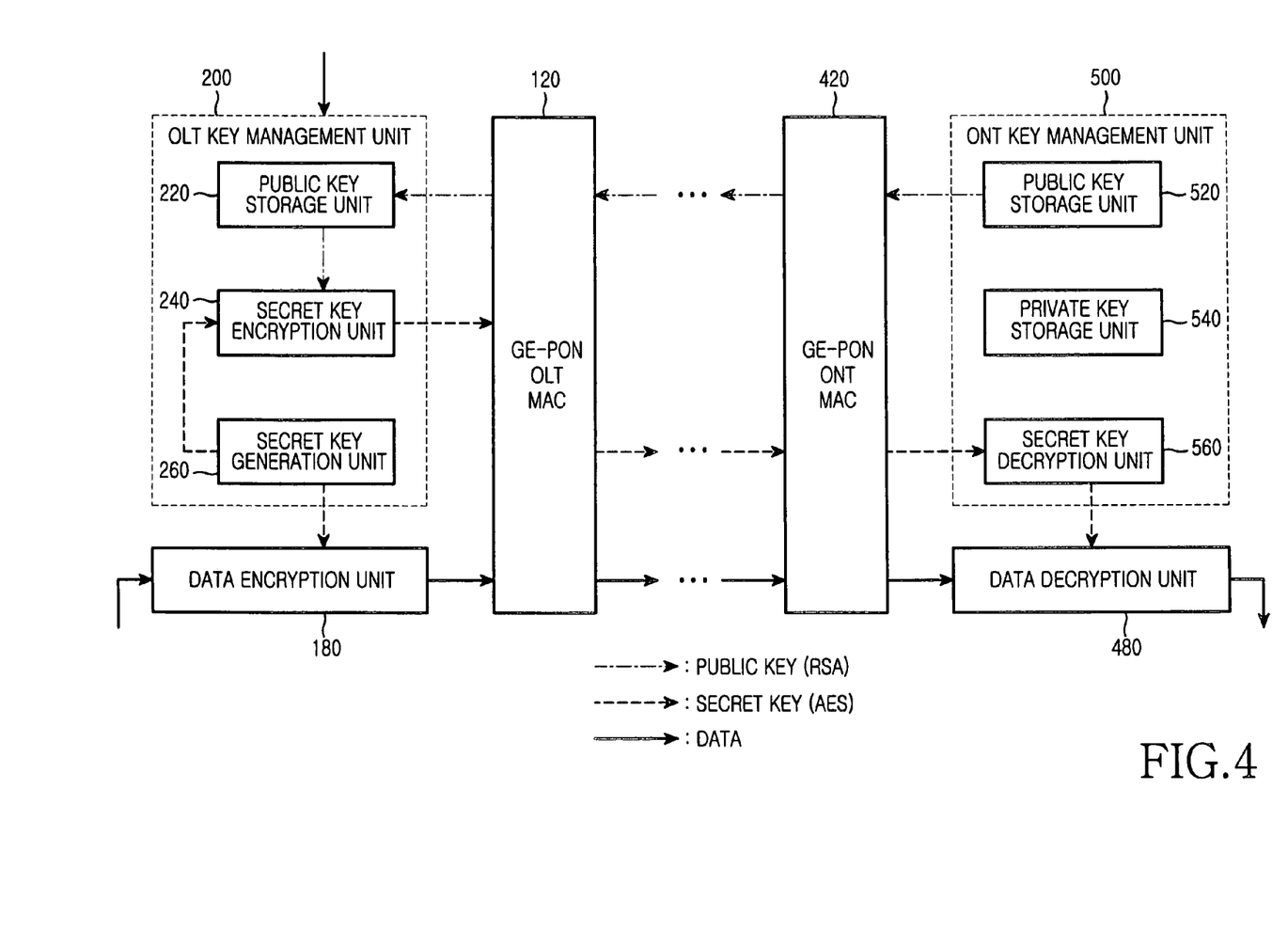
FIG. 4 is a detailed block diagram of the OLT key management unit and the ONT key management unit in FIG. 3.

FIG. 4 is a detailed block diagram of the OLT key management unit 200 and the ONT key management unit 500 in FIG. 3.

The OLT key management unit 200 includes a public key storage unit 220, a secret key encryption unit 240 and a secret key generation unit 260. The public key storage unit 220 stores a RSA public key transmitted from the ONT 400. The secret key encryption unit 240 encrypts an AES secret key by means of the RSA public key stored in the public key storage unit 220. When the RSA public key is received by the OLT 100, the secret key generation unit 260 generates the AES secret key and provides the generated AES secret key to the secret key encryption unit 240. Then, the secret key encryption unit 240 encrypts the AES secret key generated by the secret key generation unit 260 by means of the RSA public key stored in the public key storage unit 220, and transmits the encrypted AES secret key to the GE-PON OLT MAC module 120.

The data encryption unit 180 encrypts input data by means of the AES secret key generated by the secret key generation unit 260 and transmits the encrypted data to the GE-PON OLT MAC module 120.

The ONT key management unit 500 includes a public key storage unit 520, a private key storage unit 540 and a secret key decryption unit 560.

The public key storage unit 520 stores the RSA public key used for encrypting the AES secret key in the OLT 100. When the ONT 400 needs to receive a data service from the OLT 100, the ONT key management unit 500 transmits the RSA public key stored in the public key storage unit 520 to the GE-PON OLT MAC module 420. The private key storage unit 540 stores the RSA private key used for decrypting the AES secret key encrypted by means of the RSA public key transmitted from the OLT 100. When the encrypted AES secret key is received from the OLT 100, the secret key decryption unit 560 decrypts the encrypted AES secret key by means of the RSA private key stored in the private key storage unit 540.

When the encrypted data is received from the OLT 100, the data decryption unit 480 decrypts the encrypted data using the means of the AES secret key decrypted by the secret key decryption unit 560.

In this way, the OLT 100 and the ONT 400 mutually share the RSA public key and the AES secret key, and the OLT 100 encrypts data by means of the AES secret key and then transmits the encrypted AES secret key to the ONT 400, thereby enabling secure data transmission to be performed.

Figure 5:
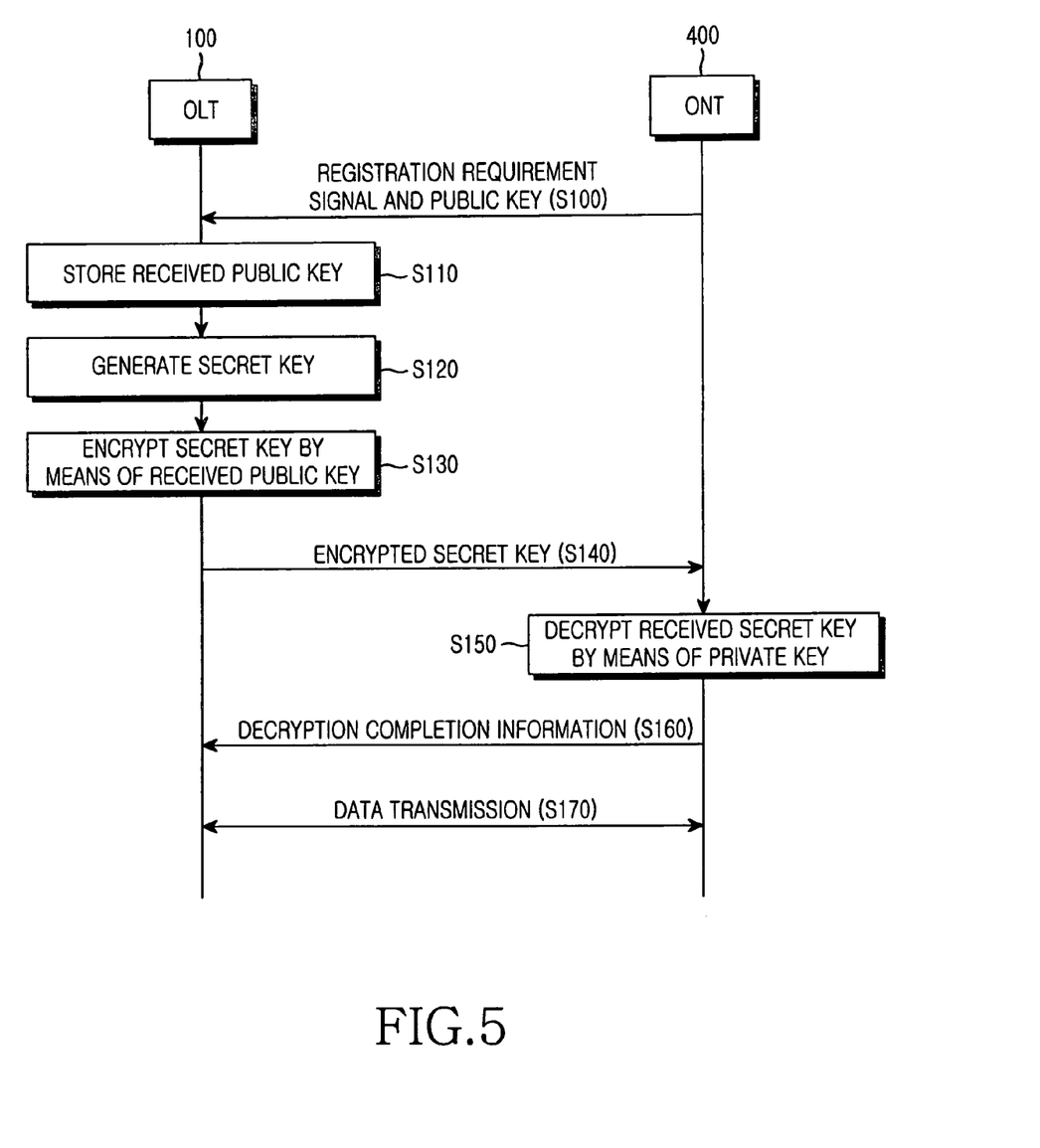
FIG. 5 is a flowchart illustrating a first embodiment of a data encryption method which can reliably transmit data between one OLT and a plurality of ONTs in a Gigabit Ethernet passive optical network structure according to aspects of the present invention.

FIG. 5 is a flowchart illustrating a first embodiment of a data encryption method that can reliably transmit data between an OLT and a plurality of ONTs in a GE-PON structure.

First, when the ONT 400 needs to receive a service from the OLT 100, the ONT 400 transmits a signal, which requires a registration, and the RSA public key, which is stored in the public key storage unit 520, to the OLT 100 in step S100. When the registration requirement signal transmitted from the ONT 400 is received, the OLT 100 registers and stores the received RSA public key in the public key storage unit 220 in step S110.

When the RSA public key is registered and stored in the public key storage unit 220, the secret key generation unit 260 generates an AES secret key and provides the generated AES secret key to the secret key encryption unit 240 in step S120. In step S130, the secret key encryption unit 240 encrypts the AES secret key, which is provided by the secret key generation unit 260, by means of the RSA public key stored in the public key storage unit 220. In step S140, the OLT 100 transmits the AES secret key encrypted by the secret key encryption unit 240 to the ONT 400.

In step S150, the secret key decryption unit 560 in the ONT 400 decrypts the encrypted AES secret key transmitted from the OLT 100 by means of the RSA private key stored in the private key storage unit 540 and stores the decrypted AES secret key. When the decryption with respect to the AES secret key is completed, the ONT 400 transmits decryption completion information to the OLT 100 in step S160. When the OLT 100 receives the decryption completion information, the OLT 100 encrypts corresponding data by means of the AES secret key generated by the secret key generation unit 260, transmits the encrypted data to the ONT 400, and then the ONT 400 performs data transmission corresponding to the transmission in step S170.

In this way, the OLT 100 and the ONT 400 mutually share the RSA public key and the AES secret key, and the OLT 100 encrypts data by means of the AES secret key and then transmits the encrypted AES secret key to the ONT 400, thereby efficiently encrypting data in the GE-PON having a point-to-multipoint structure.

Figure 6:
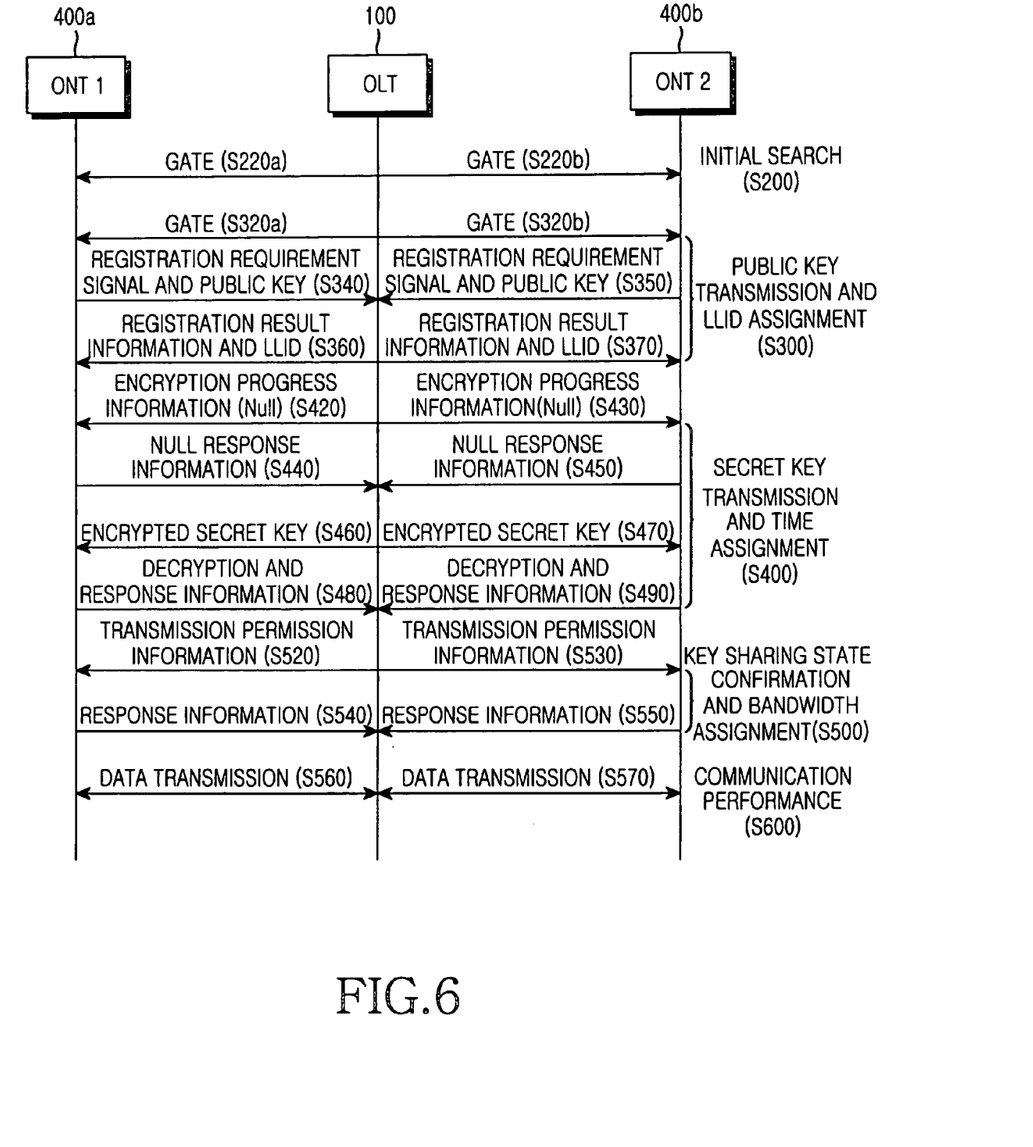
FIG. 6 is a flowchart illustrating a second embodiment of a data encryption method which can reliably transmit data between one OLT and a plurality of ONTs in a Gigabit Ethernet passive optical network structure according to aspects of the present invention.

FIG. 6 is a flowchart illustrating a second embodiment of a data encryption method that can reliably transmit data between an OLT and a plurality of ONTs in a GE-PON structure. In this embodiment, the data encryption method is applied in an initial registration step between the OLT 100 and the ONT 400. In FIG. 6, an ONT 1 400a and an ONT 2 400b have the same inside construction as that of the ONT 400 shown in FIG. 3 and FIG. 4.

The data encryption method includes an initial search step S200, a public key transmission and a logical link ID (hereinafter, referred to as a LLID) assignment step S300, a secret key transmission and a time assignment step S400, a key sharing state confirmation and bandwidth assignment step S500, and a communication performance step S600. Hereinafter, the data encryption method will be described.

When power is turned on and the OLT 100 is driven, the OLT 100 transmits gate signals to each of the ONTs in order to detect ONTs connected through a communication medium in step S220a and S220b. The ONT 1 400a and the ONT 2 400b from among a plurality of ONTs will be employed and described.

The OLT 100 transmits the gate signals to the ONT 1 400a and the ONT 2 400b at predetermined time intervals until registration requirement signals are received, in step S320a and S320b. When the gate signals transmitted from the OLT 100 are received, the ONT 1 400a and the ONT 2 400b transmit a registration requirement signal and each RSA public key stored in each public key storage unit to the OLT 100, in response to each gate signal, in step S340 and S350.

When the registration requirement signals and the RSA public keys transmitted from the ONT 1 400a and the ONT 2 400b are received, the OLT 100 registers the ONT 1 400a and the ONT 2 400b, registers/stores each RSA public key in the public key storage unit 220, and assigns LLIDs with respect to the ONT 1 400a and the ONT 2 400b. The OLT 100 transmits registration information and LLID assignment information of the ONT 1 400a and the ONT 2 400b so as to correspond to the ONT 1 400a and the ONT 2 400b, in step S360 and S370.

The OLT 100 generates and encrypts AES secret keys by means of each RSA public key transmitted from the ONT 1 400a and the ONT 2 400b. It takes a predetermined amount of time to perform such processes. Accordingly, while such processes are performed, the OLT 100 transmits information (encryption progress information: Null), which represents that the AES secret keys are being encrypted by means of the RSA public keys, to the ONT 1 400a and the ONT 2 400b in step S420 and S430. The ONT 1 400a and the ONT 2 400b receive the encryption progress information and transmit response information (Null response information) with respect to the encryption progress information to the OLT 100 in step S440 and S450.

When the AES secret keys are completely encrypted by means of the RSA public keys during such processes, the OLT 100 transmits the encrypted AES secret keys to corresponding ONT 1 400a and ONT 2 400b in step S460 and S470. The ONT 1 400a and the ONT 2 400b receive the encrypted AES secret keys from the OLT 100, decrypt the encrypted AES secret keys by means of RSA private keys and transmit decryption and response information with respect to the decryption to the OLT 100 in step S480 and S490.

When the decryption and response information are received from the ONT 1 400a and the ONT 2 400b, the OLT 100 transmits transmission permission information to the ONT 1 400a and the ONT 2 400b in step S520 and S530. The transmission permission information includes bandwidth assignment information with respect to the ONT 1 400a and the ONT 2 400b and sharing state information with respect to the RSA public keys and the AES secret keys. The ONT 1 400a and the ONT 2 400b receive the transmission permission information and transmit response information with respect to the transmission permission information to the OLT 100 in step S540 and S550.

The OLT 100, the ONT 1 400a and the ONT 2 400b, which mutually share the RSA public key and the AES secret key through the aforementioned processes, mutually transmit data encrypted by means of the AES secret key in step S560 and S570.

As described above, in the GE-PON, the OLT 100 and a plurality of ONTs share the RSA public key and the AES secret key in a state in which they mutually correspond in a one-to-one fashion. Only an ONT having a corresponding AES secret key capable of decrypting encrypted data can decrypt data by means of corresponding AES secret key, even through the OLT 100 encrypts data by means of corresponding AES secret key and transmits the encrypted data to the ONTs. In this way, data can be efficiently encrypted in a network structure having a point-to-multipoint structure.

In accordance with aspects of the present invention, the OLT encrypts the AES secret key by means of the RSA public key transmitted from the ONT and transmits the encrypted AES secret key to the ONT. Further, the OLT encrypts data by means of the AES secret key and transmits the encrypted data to the ONT. In this way, data can be efficiently encrypted in the GE-PON having a point-to-multipoint. The ONT transmits the RSA public key to the OLT, and the public key is shared by the ONT and the OLT. The OLT encrypts the AES secret key, which is used for encrypting data be means of the RSA public key, and transmits the encrypted AES secret key to the ONT, and the secret key is shared by the ONT and the OLT. In this way, data, which will be transmitted, can be efficiently encrypted in a GE-PON having the point-to-multipoint structure.

In such a GE-PON, the OLT and a plurality of ONTs share the RSA public key and the AES secret key in a state in which they mutually correspond in a one-to-one fashion. Only ONTs having a corresponding AES secret key capable of decrypting encrypted data can decrypt data by means of corresponding AES secret key, even through the OLT encrypts data by means of corresponding AES secret key and transmits the encrypted data to the ONTs. In this way, data can be efficiently encrypted in a network structure having a point-to-multipoint structure.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Gigabit Ethernet-based passive optical network comprising:
   an Optical Line Terminal (OLT) for receiving a public key through transmission medium, encrypting a secret key by means of the received public key, transmitting the encrypted secret key, encrypting data by means of the secret key, and transmitting the encrypted data, the OLT being located in a service provider-side; and an Optical Network Terminal (ONT) for transmitting the public key to the OLT, receiving the encrypted secret key transmitted from the OLT, decrypting the encrypted secret key by means of a private key residing in an ONT key management unit of the ONT for managing a public key and the private key, receiving the encrypted data, and decrypting the received encrypted data by means of the decrypted secret key, wherein the public key is used for encrypting the secret key, the secret key is encrypted by means of the public key, and the data is encrypted by the OLT by means of the secret key.

2. The Gigabit Ethernet-based passive optical network as claimed in claim 1, wherein the OLT comprises:
   a GE-PON OLT MAC module for transmitting input data to a predetermined path;
   a GMII module for providing an interface between a transmission medium and the GE-PON OLT MAC module;
   an OLT key management unit for managing a public key transmitted from the ONT and a secret key for encrypting the data; and
   a data encryption unit for encrypting the data by means of the secret key.

3. The Gigabit Ethernet-based passive optical network as claimed in claim 2, wherein the GMII module comprises:
   a PCS module for selectively encoding or decoding input blocks of data and outputting the encoded data or the decoded data;
   a PMA module for selectively performing a serial conversion or a parallel conversion with respect to input data and outputting the convened data; and
   a PMD module for convening electrical signals, which are data output from the PMA module, into optical signals, transmitting the optical signals to the transmission medium, converting optical signals received through the transmission medium 300 into electrical signals, and transmitting the electrical signals to the PMA module.

4. The Gigabit Ethernet-based passive optical network as claimed in claim 2, wherein the OLT key management unit comprises:
   a public key storage unit for storing a public key transmitted from the ONT;
   a secret key generation unit for generating a secret key for encrypting the data when the public key is stored in the public key storage unit; and
   a secret key encryption unit for encrypting the secret key generated by secret key generation unit by means of the public key stored in the public key storage unit.

5. The Gigabit Ethernet-based passive optical network as claimed in claim 1, wherein the ONT comprises:
   a GE-PON OLT MAC module for transmitting input data to a predetermined path;
   a GMII module for providing an interface between a transmission medium and the GE-PON OLT MAC module;
   the ONT key management unit for decrypting the encrypted data transmitted from the OLT by means of the private key; and
   a data decryption unit for decrypting the encrypted data transmitted from the OLT by means of the secret key decrypted by the OLT key management unit.

6. The Gigabit Ethernet-based passive optical network as claimed in claim 5, wherein the GMII module comprises:
   a PCS module for selectively encoding or decoding input blocks of data and outputting the encoded data or the decoded data;
   a PMA module for selectively performing a serial conversion or a parallel conversion with respect to input data and outputting the converted data; and
   a PMD module for converting electrical signals, which are data output from the PMA module, into optical signals, transmitting the optical signals to the transmission medium, converting optical signals received through the transmission medium 300 into electrical signals, and transmitting the electrical signals to the PMA module.

7. The Gigabit Ethernet-based passive optical network as claimed in claim 1, wherein the ONT key management unit comprises:
   a public key storage unit for storing the public key;
   a private key storage unit for storing the private key; and
   a secret key decryption unit for decrypting the encrypted secret key transmitted from the OLT by means of the secret key stored in the private key storage unit, and outputting the decrypted secret key to the data decryption unit.

8. The Gigabit Ethernet-based passive optical network as claimed in claim 1, wherein the public key and the private key are respectively a RSA public key and a RSA private key.

9. The Gigabit Ethernet-based passive optical network as claimed in claim 1, wherein the secret key is an AES secret key.

10. An encryption method for transferring data between an Optical Line Terminal (OLT) and a plurality of Optical Network Terminals (ONTs) in a Gigabit Ethernet-based passive optical network, the encryption method comprising the steps of:
    a) transmitting, by the ONT, a public key to the OLT;
    b) encrypting, by the OLT, a secret key by means of the public key transmitted from the ONT and transmitting the encrypted secret key to the ONT;
    c) decrypting, by the ONT, the encrypted secret key transmitted from the OLT by means of a private key residing in the ONT in an ONT key management unit for managing a public key and the private key;
    d) encrypting, by the OLT, data by means of the secret key and transmitting the encrypted data to the ONT; and
    e) decrypting, by the ONT, the encrypted data transmitted from the OLT by means of the decrypted secret key.

11. The encryption method as claimed in claim 10, wherein step b) comprises:
    b-1) storing the public key transmitted from the ONT;
    b-2) generating a secret key for encrypting the data when the public key is stored;
    b-3) encrypting the secret key by means of the public key; and
    b-4) transmitting the encrypted secret key to the ONT.

12. An encryption method for transferring data between an Optical Line Terminal (OLT) and a plurality of Optical Network Terminals (ONTs) in a Gigabit Ethernet-based passive optical network, the encryption method comprising the steps of:
    a) transmitting, when power is turned on and the OLT is driven, gate signals to the ONTs in order to detect ONTs connected through a transmission medium;
    b) transmitting, by the ONTs, registration requirement signals and RSA public keys corresponding to the gate signal;
    c) registering, by the OLT, the ONTs in accordance with the registration requirement signals transmitted from the ONTs, assigning Logical Link IDs (LLIDs) with respect to the ONTs, and transmitting information for the assignment to the ONTs;
    d) encrypting, by the OLT, secret keys by means of the public keys and transmitting the encrypted secret keys to the ONTs;

e) decrypting, by the ONTs, the encrypted secret keys transmitted from the OLT by means of private keys residing in an ONT key management unit ONT for managing a public key and a private key;

f) confirming, by the OLT and the ONTs, mutual sharing of the public keys and the secret keys, the OLT assigning bandwidth necessary for data transmission to the ONTs;

g) encrypting, by the OLT, data by means of the secret keys and transmitting the encrypted data to the ONTs; and h) decrypting, by the ONTs, the encrypted data transmitted from the OLT by means of the decrypted secret keys.

13. An encryption method for transferring data by an Optical Line Terminal (OLT) in a Gigabit Ethernet-based passive optical network, the encryption method comprising the steps of:

transmitting, when power is turned on and the OLT is driven, gate signals through a transmission medium;

receiving registration requirement signals and RSA public keys corresponding to the gate signals;

registering the received registration requirement signals, assigning respective Logical Link IDs (LLIDs) with respect to the registration requirement signals;

transmitting information for the assignment;

encrypting secret keys by means of the public keys and transmitting the encrypted secret keys;

confirming mutual sharing of the public keys and the secret keys;

assigning bandwidths necessary for data transmission;

encrypting data using the secret keys; and transmitting the encrypted data.

* * * * *